(12) United States Patent
Woo

(10) Patent No.: US 6,447,121 B1
(45) Date of Patent: Sep. 10, 2002

(54) REFLECTION TYPE PROJECTOR

(75) Inventor: Sung-je Woo, Suwon (KR)

(73) Assignee: Samsung Electronics, Co., Ltd., Suwon (KR)

(*) Notice: Subject to any disclaimer, the term of this patent is extended or adjusted under 35 U.S.C. 154(b) by 0 days.

(21) Appl. No.: 09/571,164

(22) Filed: May 16, 2000

(30) Foreign Application Priority Data

May 17, 1999 (KR) .......................................... 99-17597

(51) Int. Cl.[7] .............................................. G03B 21/16
(52) U.S. Cl. ........................... 353/52; 353/56; 349/161
(58) Field of Search ............................. 353/52, 56, 60, 353/61; 349/161

(56) References Cited

U.S. PATENT DOCUMENTS

| | | | | |
|---|---|---|---|---|
| 5,170,194 A | * | 12/1992 | Kurematsu et al. | 353/52 |
| 5,772,300 A | * | 6/1998 | Kitai | 353/57 |
| 5,803,566 A | * | 9/1998 | Ogino | 353/60 |
| 6,057,894 A | * | 5/2000 | Kobayashi | 349/5 |
| 6,231,191 B1 | * | 5/2001 | Shiraishi et al. | 353/61 |
| 2001/0013924 A1 | * | 8/2001 | Yokoyama et al. | 353/52 |

FOREIGN PATENT DOCUMENTS

| | | |
|---|---|---|
| JP | 62-229117 | 10/1987 |
| JP | 4-125538 | 4/1992 |
| JP | 5-264947 | 10/1993 |
| JP | 6-281906 | 10/1994 |
| JP | 8-146378 | 6/1996 |
| JP | 10-48762 | 2/1998 |
| JP | 10-319423 | 12/1998 |
| JP | 11-14943 | 1/1999 |

* cited by examiner

*Primary Examiner*—William Dowling
(74) *Attorney, Agent, or Firm*—Robert E. Bushnell, Esq.

(57) ABSTRACT

A reflection type projector includes a light source, a polarization beam splitter for polarizing light emitted from the light source, a display device disposed next to the polarization beam splitter for forming an image, a projection lens unit for projecting an image reflected by the display device, a thermoelectric element installed such that the front surface thereof is in contact with the rear surface of the display device, a heat sink installed at the rear surface of the thermoelectric element, a heat pipe of which one end is connected to the heat sink, and a heat radiating plate connected to the other end of the heat pipe. Thus, the heat accumulated in the display device can be dissipated rapidly and with no noise, so that the projector can be operated more silently. Also, the life span of the display device is increased.

9 Claims, 3 Drawing Sheets

REFLECTION TYPE PROJECTOR

This application makes reference to, incorporates the same herein, and claims all benefits accruing under 35 U.S.C. § 119 from the inventor's application REFLECTION TYPE PROJECTOR filed with the Korean Industrial Property Office on May 17, 1999 and there duly assigned Ser. No. 17597/1999.

BACKGROUND OF THE INVENTION

1. Field of the Invention

The present invention relates to a reflection type projector system, and more particularly, to a reflection type projector in which the structure for cooling a display device for forming an image is improved. The invention also concerns a process for accomplishing the foregoing.

2. Description of the Related Art

Generally, projectors for projecting images, such as those generated by video display devices onto a screen, may be characterized as either a transmission type projector in which light passes through a display device to project the images onto a screen, or a reflection type projector in which light is reflected by the display device to project the images onto the screen. The temperature of the display devices increases during the operation of the projector due to the heat generated from the display devices themselves and due to the beam input from the internal light sources. Sufficient increase in the temperature of the display devices causes the image to deteriorate. Typically, a fan is installed at the projector to cool the display devices. Operation of the fan however, generates noise and precipitates dust that adheres to the display devices so that the quality of an image is reduced. It is therefore desired that a way be found to enhance cooling of video display devices without creating dust and noise problems.

SUMMARY OF THE INVENTION

It is an object of the present invention to provide an improved reflection type process and video display projector.

It is another object to provide a video display process and reflection type projector furnishing an enhanced degree of cooling to the video display components.

It is still another object to provide a video display process and reflection type projector characterized by a reduction in noisiness.

It is yet another object to provide a video display process and reflection type projector exhibiting a heightened degree of internal cleanliness.

It is still yet another object to provide a video display process and projector able to improve the maintenance of high quality images over a longer term of use.

It is a further another object to provide a process and reflection type projector having an improved structure so that noise is not generated and an appropriate temperature can be maintained during the cooling of the display devices.

These and other objects may be attained with a reflection type projector constructed with a light source, a polarization beam splitter for polarizing light emitted from the light source, a display device disposed next to the polarization beam splitter for forming an image, a projection lens unit for projecting an image reflected by the display device, a thermoelectric element installed such that the front surface thereof is in contact with the rear surface of the display device, a heat sink installed at the rear surface of the thermoelectric element, a heat pipe of which one end is connected to the heat sink, and a heat radiating plate connected to the other end of the heat pipe.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components.

DETAILED DESCRIPTION OF THE INVENTION

Figure 1:
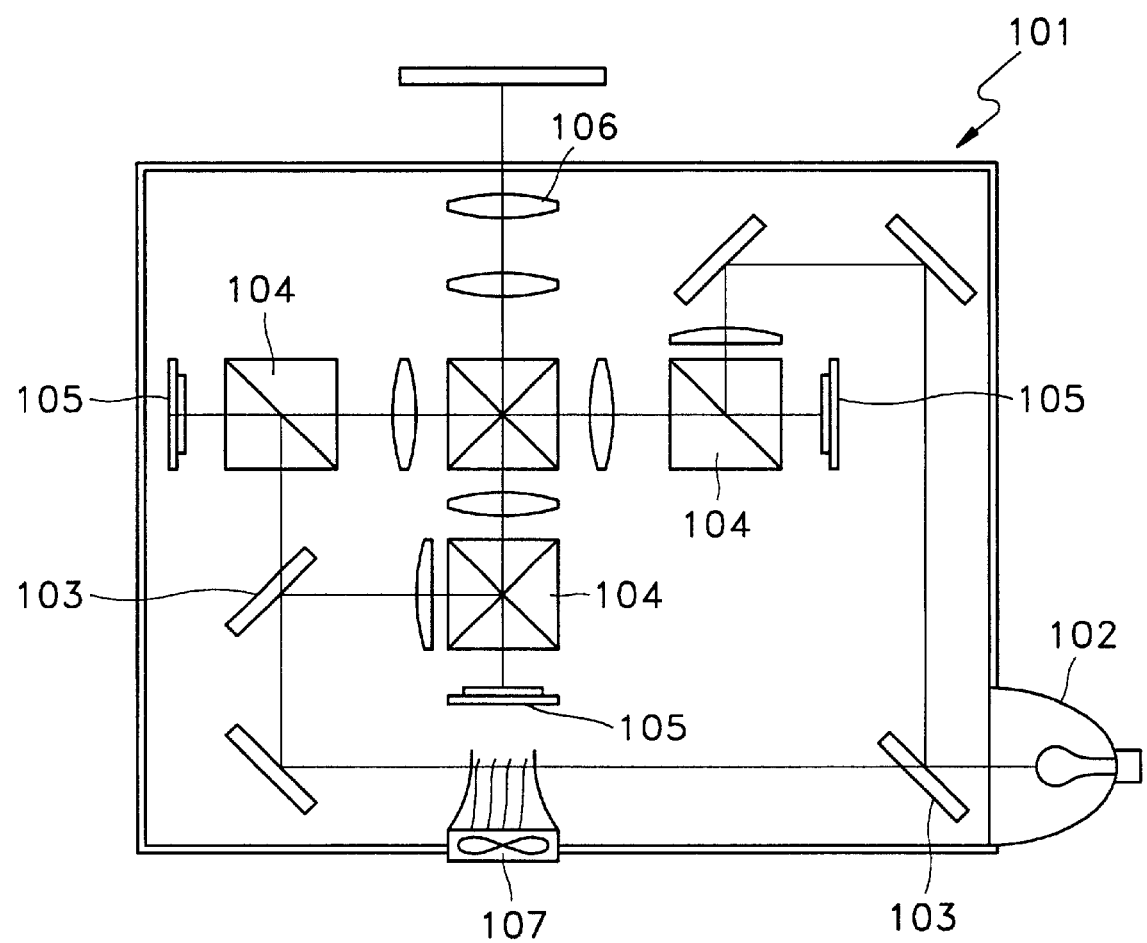
FIG. 1 is a sectional view showing major parts of a conventional reflection type projector.

Turning now to the drawings, FIG. 1 shows a conventional reflection type projector 100 that may be constructed with a light source 102 provided at a main body 101, dichroic mirrors 103, polarization beam splitters 104, reflection type display devices 105, a projection lens 106, and a blowing fan 107. Dichroic mirrors 103 are for splitting white light emitted from light source 102 into red, green and blue light according to the wavelength area thereof. Polarization beam splitters 104 are for polarizing incident light and transmitting or reflecting the polarized light to change the path of the incident light. Reflection type display devices 105 are for generating an image from the incident light of one polarization input via polarization beam splitter 104. Projection lens 106 is for magnifying and projecting the image generated by display device 105 and passing it through polarization beam splitter 104.

Each of reflection type display devices 105 is a ferroelectric liquid crystal display (FLCD) exhibiting a fast response time. The FLCDs have a two-dimensional array of pixels so that each pixel is selectively driven corresponding to input video signals to modulate a polarization direction, thus forming a predetermined image.

During operation of the projector, the temperature of display devices 105 increases due to the heat generated from the display devices themselves and the beam input from light source 102. When the temperature of the display devices increases, the image is deteriorated. To prevent the temperature increase of display devices 105, blowing fan 107 is installed at main body 101 to cool the display devices according to conventional technology. When blowing fan 107 is operated to cool display devices 105 in a conventional reflection type projector however, noise is generated and dust adheres to the display devices so that the image quality is lowered.

Figure 2:
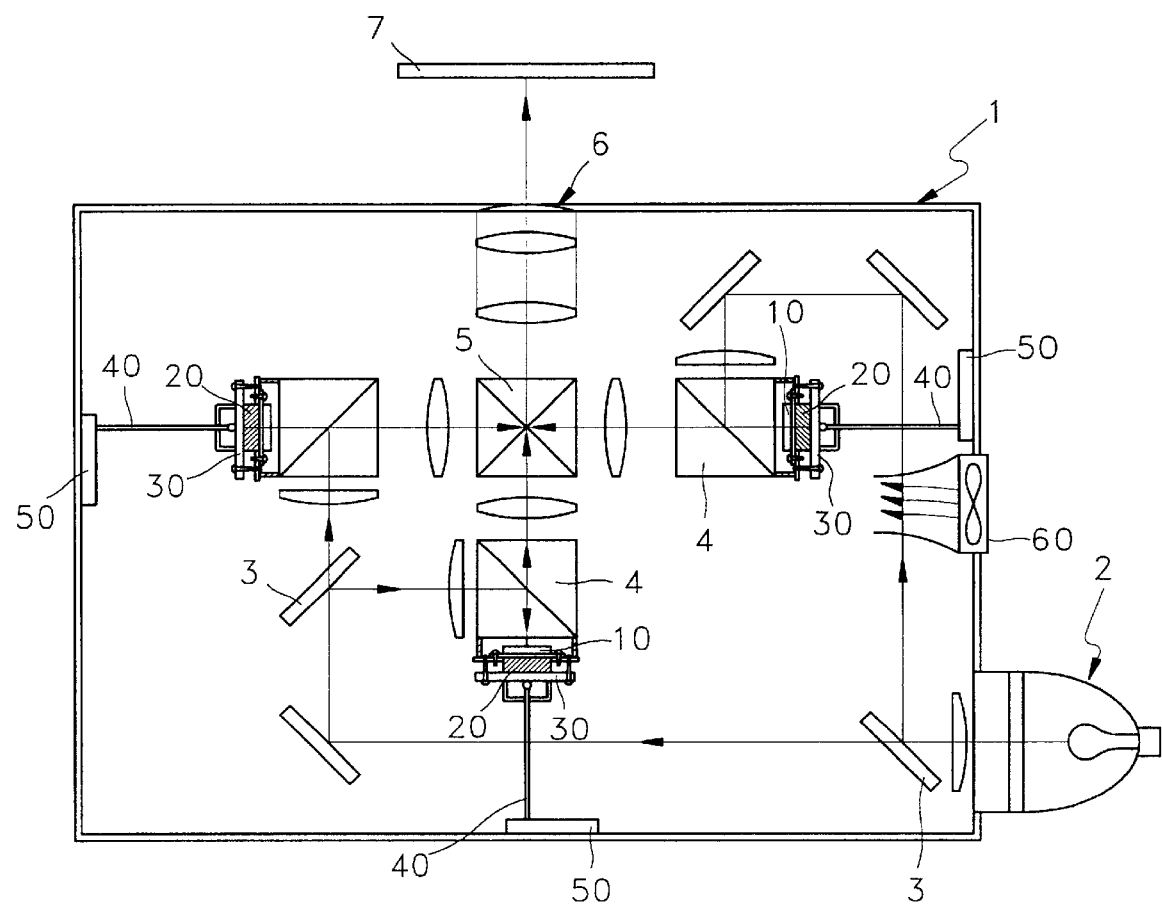
FIG. 2 is a sectional view showing major parts of a reflection type projector constructed according to the principles of the present invention.
Figure 3:
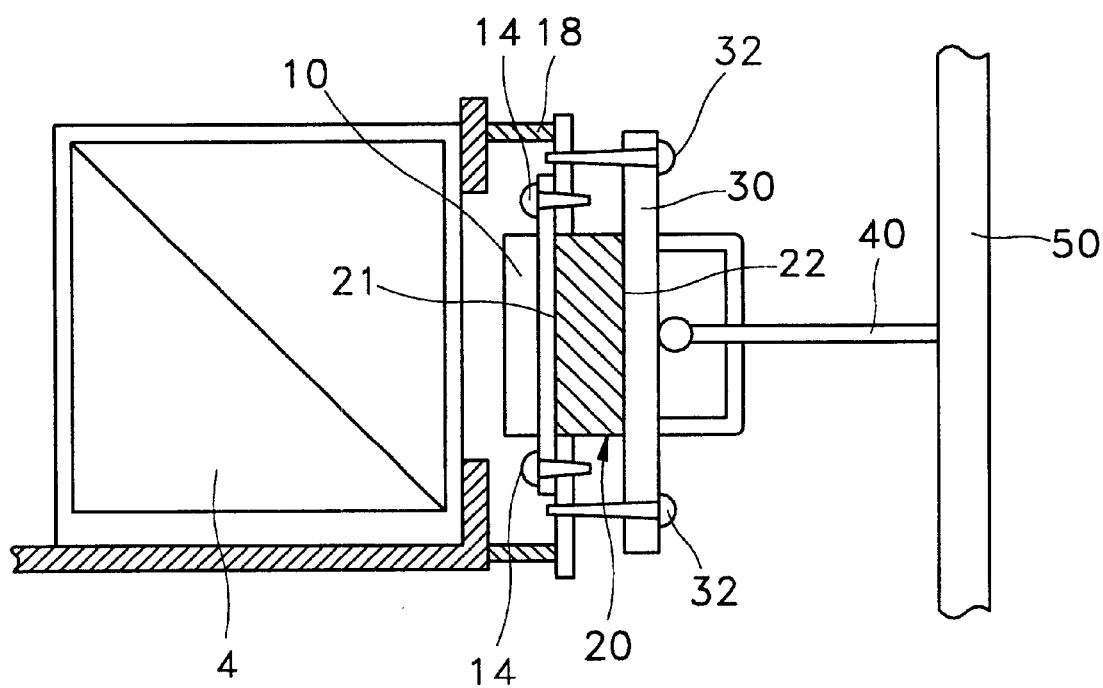
FIG. 3 is a sectional view showing part of the reflection type projector shown in FIG. 2.

Referring now to FIG. 2, a reflection type projector according to a preferred embodiment of the present invention includes a light source 2 provided at a main body 1, dichroic mirrors 3, polarization beam splitters 4, display devices 10, a color prism 5 and a projection lens unit 6.

As before, dichroic mirrors 3 split white light emitted from light source 2 into red, green and blue light according to the respective wavelengths thereof. Polarization beam splitters 4 changes the path of each light beam split by dichroic mirror 3. Display devices 10 form an image from monochromatic light reflected by the polarization beam splitter and reflect the formed image. Color prism 5 changes the optical path of the image reflected by display device 10. Projection lens unit 6 magnifies the image passing through color prism 5 and projects it to a screen 7.

Unlike the conventional reflection type projector, however, the reflection type projector according to a preferred embodiment of the present invention includes a thermoelectric element 20, a heat sink 30, a heat pipe 40, and a heat radiating plate 50.

Thermoelectric element 20 is a device typically referred to as a Peltier chip. When electricity is applied to thermoelectric element 20, one side thereof is cooled to absorb heat and the other side is heated to dissipate heat. A cooling portion 21 of thermoelectric element 20 is in contact with the rear surface of display device 10 by being coupled thereto by screws 14.

Heat sink 30 is in contact with a heating portion 22, dissipating heat by being coupled thereto by screws 32. Heat pipe 40 is formed of metal exhibiting superior thermal conductivity, and one end thereof is connected to heat sink 30. Heat radiating plate 50 is coupled to main body and is connected by the other end of heat pipe 40. Thus, the heat transferred to heat radiating plate 50 via heat pipe 40 is dissipated through main body 1.

A sealing member 18 is provided to prevent dust from entering in between polarization beam splitter 4 and thermoelectric element 20. Preferably, a blowing fan 60 is installed to forcibly cool heat sink 30.

In the operation of the reflection type projector having the above structure, when the temperature of display device 10 increases beyond a certain temperature, a sensor (not shown) for detecting the temperature generates signals and electricity is applied to thermoelectric element 20 according to the signals. As the electricity is applied to the thermoelectric element 20, cooling portion 21 of thermoelectric element 20 contacting the rear surface of display device 10 absorbs heat accumulated in display device 10 so that an increase in temperature of the display device is prevented.

The heat absorbed by thermoelectric element 20 is transferred to heat sink 30 through heating portion 22 of thermoelectric element 20. Then, the heat is transferred to heat radiating plate 50 through heat pipe 40 connected to heat sink 30 to be dissipated outside main body 1.

As the heat is transferred to main body 1 via thermoelectric element 20, heat sink 30, heat pipe 30 and heat radiating plate 50, the heat accumulated in display device 10 is dissipated and noise is not generated. Also, as display device 10 is installed in a closed space between polarization beam splitter 4 and thermoelectric element 20, dust is prevented from adhering to display device 10.

In the present embodiment, blowing fan 60 is operated to forcibly cool heat sink 30. Cooling performance is thus improved relative to a system in which blowing fan 60 is not operated.

As described above, when the reflection type projector according to a present invention is used, the heat generated from display device 10 or radiated from light source 2 can be rapidly dissipated through thermoelectric element 20, heat sink 30 and heat pipe 40 so that display device 10 can be maintained at an appropriate temperature. Thus, the heat accumulated in display device 10 can be dissipated rapidly and with no noise so that the projector can be operated more silently. Also, life span of display device 10 is increased.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. In a reflection type projector system comprising:
    a light source;
    a polarization beam splitter for polarizing light emitted from the light source and for providing a split beam;
    disposed to receive the split beam, a LCD reflection display device for forming an image; and
    a projection lens unit for projecting the image formed by the display device;
    the improvement comprising a cooling system comprising:
        a thermoelectric element installed such that a front surface thereof is in contact with a rear surface of the LCD reflection display device;
        a heat sink installed at a rear surface of the thermoelectric element;
        a heat pipe of which one end is connected to the heat sink; and
        a heat radiating plate connected to the other end of the heat pipe.

2. The reflection type projector system of claim 1, wherein the LCD reflection display device is installed in a closed space between the polarization beam splitter and the thermoelectric element.

3. The reflection type projector system of claim 1, wherein the system further comprises a blowing fan for forcibly cooling the heat sink.

4. In a reflection type projection process comprising the steps of:
    (1) passing a light beam from a light source to a polarization beam splitter to polarize the light beam;
    (2) passing the polarized light beam to an LCD reflection display device to form an image; and
    (3) projecting the image through a projection lens unit; the improvement comprising the further steps of:
        (a) cooling the display device with a thermoelectric element installed such that a front surface thereof contacts a rear surface of the display device; and
        (b) cooling the thermoelectric element by a heat sink installed in contact with a rear surface of the thermoelectric element.

5. In a reflection type projection process comprising the steps of:
    (1) passing a light beam from a light source to a polarization beam splitter to polarize the light beam;
    (2) passing the polarized light beam to an LCD reflection display device to form an image; and
    (3) projecting the image through a projection lens unit; the improvement comprising the further steps of
        (a) cooling the display device with a thermoelectric element installed such that a front surface thereof contacts a rear surface of the display device; and
        (b) cooling the thermoelectric element by a heat sink installed in contact with a rear surface of the thermoelectric element, said heat sink connected to a first end of a heat pipe for conducting heat away from the heat sink.

6. The process of claim 5, wherein said heat pipe is connected to a heat radiating plate at a second end of the heat pipe.

7. The process of claim 5, wherein said heat sink is forcibly cooled by a blowing fan.

8. In an LCD display device for a reflection type projector system, said LCD display device having a front side adapted to be disposed toward a beam splitter and a rear side adapted to be disposed away from the beam splitter, the improvement comprising:

in contact with the rear side of the LCD display device, a thermoelectric element, said thermoelectric element having a front side in contact with said rear side of the LCD display device, said thermoelectric element having a back side disposed away from said LCD display device; and in contact with the back side of the thermoelectric element, a heat sink.

9. In an LCD display device for a reflection type projector system, said LCD display device having a front side adapted to be disposed toward a beam splitter and a rear side adapted to be disposed away from the beam splitter, the improvement comprising:

in contact with the rear side of the LCD display device, a thermoelectric element, said thermoelectric element having a front side in contact with said rear side of the LCD display device, said thermoelectric element having a back side disposed away from said LCD display device; and in contact with the back side of the thermoelectric element, a heat sink, said heat sink having a front side in contact with the back side of the thermoelectric element and a rear side disposed away from said thermoelectric element, said rear side of said heat sink having a first end of a heat pipe attached thereto, said heat pipe having a second end attached to a heat radiating plate.

* * * * *